United States Patent
Zhang et al.

(10) Patent No.: US 11,800,544 B2
(45) Date of Patent: Oct. 24, 2023

(54) FRAME STRUCTURE INDICATING METHOD AND DEVICE, FRAME STRUCTURE DETERMINING METHOD AND DEVICE, STORAGE MEDIUM, AND PROCESSOR

(71) Applicant: ZTE CORPORATION, Shenzhen (CN)

(72) Inventors: Chenchen Zhang, Shenzhen (CN); Feng Bi, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 65 days.

(21) Appl. No.: 17/054,588

(22) PCT Filed: May 9, 2019

(86) PCT No.: PCT/CN2019/086096
§ 371 (c)(1),
(2) Date: Nov. 11, 2020

(87) PCT Pub. No.: WO2019/214659
PCT Pub. Date: Nov. 14, 2019

(65) Prior Publication Data
US 2021/0185687 A1 Jun. 17, 2021

(30) Foreign Application Priority Data
May 11, 2018 (CN) .......................... 201810459922.7

(51) Int. Cl.
*H04W 4/00* (2018.01)
*H04W 72/53* (2023.01)
(Continued)

(52) U.S. Cl.
CPC .......... *H04W 72/53* (2023.01); *H04L 5/0007* (2013.01); *H04W 72/0446* (2013.01); *H04W 72/23* (2023.01); *H04W 76/28* (2018.02)

(58) Field of Classification Search
None
See application file for complete search history.

(56) References Cited

U.S. PATENT DOCUMENTS

| 8,520,606 B2 * | 8/2013 | Cleveland | ........... H04L 27/0006 455/448 |
| 2010/0172311 A1 * | 7/2010 | Agrawal | ............... H04L 5/0082 370/329 |

(Continued)

FOREIGN PATENT DOCUMENTS

| CN | 101374358 A | 2/2009 |
| CN | 101924727 A | 12/2010 |

(Continued)

OTHER PUBLICATIONS

Zte et al. "Forward Compatibility for Numerology and Frame Structure Design" 3GPP TSG-RAN WG1 Meeting #85, R1-164261, May 27, 2016 (May 27, 2016), 2 Discussion, 2.1 Self-Contained Frame Structure, 2.2 Flexible Frame Structure in Time.

(Continued)

*Primary Examiner* — Zewdu A Beyen
(74) *Attorney, Agent, or Firm* — Bond, Schoeneck & King, PLLC; George R. McGuire (57) ABSTRACT

Provided are method and device for indicating a frame structure. The method includes determining one or multiple first time units; and indicating the frame structure of the one or multiple first time units. Further provided are method and device for determining a frame structure, a storage medium, and an electronic device.

14 Claims, 4 Drawing Sheets

(51) Int. Cl.
  *H04W 76/28* (2018.01)
  *H04L 5/00* (2006.01)
  *H04W 72/0446* (2023.01)
  *H04W 72/23* (2023.01)

(56) References Cited

U.S. PATENT DOCUMENTS

| | | | |
|---|---|---|---|
| 2015/0055632 A1* | 2/2015 | Gou | H04L 27/2601 370/336 |
| 2015/0282178 A1 | 10/2015 | Kim et al. | |
| 2015/0327325 A1* | 11/2015 | Koivisto | H04W 76/27 370/350 |
| 2017/0064579 A1* | 3/2017 | Park | H04W 28/0284 |
| 2018/0091267 A1 | 3/2018 | Kim et al. | |
| 2018/0123747 A1 | 5/2018 | Wang et al. | |
| 2018/0184450 A1* | 6/2018 | Cavalcanti | H04W 72/566 |
| 2018/0368122 A1* | 12/2018 | Kuchibhotla | H04L 5/0007 |

FOREIGN PATENT DOCUMENTS

| | | |
|---|---|---|
| CN | 104854801 A | 8/2015 |
| JP | 2018011209 A | 1/2018 |
| WO | 2017130993 A1 | 12/2018 |

OTHER PUBLICATIONS

Zte et al. "Remaining Details on Group-Common PDCCH" 3 GPP TSG RAN WG1 Meeting #91, R1-1719670, Dec. 1, 2017 (Dec. 1, 2017), 2.2 Multi-Slot Indication, 3.2 Monitor Occasion Configuration for SFI, Fig. 1.

International Search Report Form PCT/ISA/210, and Written Opinion Form PCT/ISA/237, International Application No. PCT/CN2019/086096, pp. 1-5 International Filing Date May 9, 2019, search report dated Aug. 9, 2019.
Samsung "DL and UL Assignment for NR TDD", 3GPP Draft; R1-1715986 TDD, Operational Final, 3rd Generation Partnership Project (3GPP), Sep. 17, 2017.
Georgios Orfanos, et al. "A Centralized MAC Protocol with QoS Support for Wireless LANs" IEEE International Symposium on Personal, Indoor and Mobile Radio Communications., Sep. 1, 2007.
Huawei, et al. "Physical layer enhancement on IAB", 3GP Draft; R1-1803695, Apr. 15, 2018.
AT&T "Summary of 7.7.1 Enhancements to support NR backhaul links", 3Gpp Draft; R1-1805673 Apr. 19, 2018.
European Search Report, pp. 1-12, dated Jan. 5, 2022.
D1:ZTE Microelectronics, 3GPP Draft; R1-164261 Forward compatibilty for numerology and frame structure design, May 14, 2016 3rd Generation Partnership Project (3GPP), Mobile Competence Centre ; 650, route des Lucioles; F-06921 Sophia-Antipolis Cedex ; France.
D2:ZTE Sanechips , 3GPP Draft; R1-1719670 Remaining details on group-common PDCCH, Nov. 18, 2017 3rd Generation Partnership Project (3GPP), Mobile Competence Centre ; 650, route des Lucioles; F-06921 Sophia-Antipolis Cedex; France.
Intellectual Property of India, Office Action, dated Dec. 16, 2021, pp. 1-6.
Translated Japanese Office Action, dated Dec. 21, 2021. pp. 1-7.
Translated Korean Office Action, pp. 1-5.
3GPP TSG RAN WG1, Meeting #92bis, Discussion of Resource Allocation for IAB, Agenda Item 7.7.1 R1-1803990; Sanya, China Apr. 16-20, 2018.

* cited by examiner

FRAME STRUCTURE INDICATING METHOD AND DEVICE, FRAME STRUCTURE DETERMINING METHOD AND DEVICE, STORAGE MEDIUM, AND PROCESSOR

This application claims priority to Chinese Patent Application No. 201810459922.7 filed with the CNIPA on May 11, 2018, the disclosure of which is incorporated herein by reference in its entirety.

TECHNICAL FIELD

Embodiments of the present disclosure relate to the field of communications and, in particular, to method and device for indicating a frame structure, method and device for determining a frame structure, a storage medium, and a processor.

BACKGROUND

In Long Term Evolution Advanced (LTE-A), the use of the relay technology can effectively expand network coverage and improve the cell-edge data rate, and the use of wireless backhaul can avoid the construction of wired transmission networks and facilitate rapid deployment, thereby reducing the construction and operating costs of operators. Therefore, the relay technology is one of the main technologies adopted by the LTE-A system. In the LTE-A relay technology, for the frame structure design, a time-division half-duplex scheme based on a fake MBSFN subframe is adopted. That is, multicast-broadcast single-frequency network (MBSFN) subframe configuration is used: some fake MBSFN subframes are configured for backhaul link transmission, and an access link uses non-MBSFN subframes. In this manner, time-division duplex of a backhaul link and the access link is achieved and is completely transparent to a terminal.

In future 5G or subsequent evolutionary versions, the relay technology will be further utilized. For example, in the integrated access and backhaul (IAB) technology, multi-hop relay will be further supported based on 5G new radio (NR) systems, and a network topology supports redundant connectivity. In such a network topology, system resources may be shared by different types of links and may be multiplexed in a time-division multiplexing (TDM), frequency-division multiplexing (FDM) or space-division multiplexing (SDM) mode. In different multiplexing modes, the frame structures of different types of links may be indicated in a manner different from what is currently defined.

It is still unknown in the related art how to accurately indicate different frame structures.

SUMMARY

Embodiments of the present disclosure provide a method and a device for indicating a frame structure, a method and a device for determining a frame structure, a storage medium, and a processor.

Embodiments of the present disclosure provide a method for indicating a frame structure. The method includes: determining one or multiple first time units; and indicating the frame structure of the one or multiple first time units.

Embodiments of the present disclosure provide a method for determining a frame structure. The method includes receiving an indication of the frame structure of one or multiple first time units; and determining the frame structure of the one or multiple first time units according to the indication of the frame structure.

Embodiments of the present disclosure provide a device for indicating a frame structure. The device includes a first determination module configured to determine one or multiple first time units; and an indication module configured to indicate the frame structure of the one or multiple first time units.

Embodiments of the present disclosure provide a device for determining a frame structure. The device includes a receiving module configured to receive an indication of the frame structure of one or multiple first time units; and a second determination module configured to determine the frame structure of the one or multiple first time units according to the indication of the frame structure.

Embodiments of the present disclosure further provide a storage medium. A computer program is stored in the storage medium. When the computer program is executed, the steps in any one of the preceding method embodiments are performed.

Embodiments of the present disclosure further provide an electronic device. The electronic device includes a memory and a processor. A computer program is stored in the memory. The processor is configured to execute the computer program to perform the steps in any one of the preceding method embodiments.

BRIEF DESCRIPTION OF DRAWINGS

The drawings described herein are used to provide a further understanding of the present disclosure and form a part of the present disclosure. Illustrative embodiments and the description thereof are used to explain the present disclosure and are not intended to improperly limit the present disclosure. In the drawings.

DETAILED DESCRIPTION

It is to be noted that the terms "first", "second" and the like in the description, claims and drawings of the present disclosure are used to distinguish between similar objects and are not necessarily used to describe a particular order or sequence. It is to be understood that the data used in this manner is interchangeable under appropriate circumstances so that embodiments of the present disclosure described herein may also be implemented in a sequence not illustrated or described herein. In addition, the terms "include", "have" or any other variations thereof are intended to encompass a non-exclusive inclusion. For example, a process, method, system, product or equipment that includes a series of steps or units not only includes the expressly listed steps or units but may also include other steps or units that are not expressly listed or are inherent to such process, method, product or equipment.

In 5G NR frame structure configuration, both semi-static configuration and dynamic configuration are currently supported. Semi-static configuration supports cell-specific configuration and UE-specific configuration. Dynamic configuration is indicated using a slot format indicator (SFI) carried on group-common Physical Downlink Control Channel (PDCCH). Regardless of semi-static configuration or dynamic configuration, three types are supported in terms of frame structure type: downlink, uplink, and flexible. Different configuration approaches are defined for semi-static cell-specific configuration and UE-specific configuration. For cell-specific configuration, configuration is performed in units of specific periods, and a frame structure in one or two specific periods may be configured. UE-specific configuration is per slot configuration in which a Flexible field in cell-specific configuration can be rewritten. One SFI can indicate a frame structure of one slot or multiple continuous slots, and various slot formats are defined in 5G NR. A base station can semi-statically configure multiple combinations for slot formats for a terminal, and the SFI can indicate one combination for slot formats for one carrier, which includes one or multiple slot formats, respectively indicating the frame structure of one slot or multiple slots.

Embodiments of the present disclosure provide a frame structure indication method embodiment. It is to be noted that steps illustrated in flowcharts in the drawings may be performed by a computer system such as a group of computers capable of executing instructions, and although logical sequences are illustrated in the flowcharts, the illustrated or described steps may be performed in sequences different from those described herein in some cases.

Figure 1:
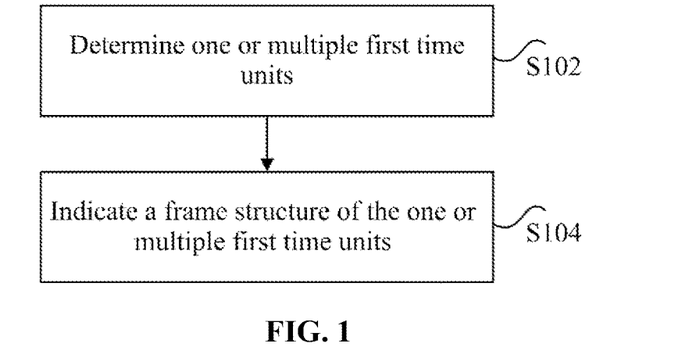
FIG. 1 is a flowchart of a method for indicating a frame structure according to an embodiment of the present disclosure.

FIG. 1 is a flowchart of a method for indicating a frame structure according to an embodiment of the present disclosure. As shown in FIG. 1, the method includes steps described below.

In S102, one or multiple first time units are determined.

In S104, a frame structure of the one or multiple first time units is indicated.

According to the preceding steps of the present disclosure, one or multiple first time units are determined, and the frame structure including the one or multiple first time units is indicated. In this manner, different frame structures can be accurately indicated.

It is to be noted that a transmission direction on the one or multiple first time units is indicated by the frame structure. The transmission direction may be, for example, downlink transmission, uplink transmission, or flexible direction.

In an embodiment, the method further includes that a number of second time units included in the first time unit is predefined by a system; or the number of the second time units included in the first time unit is semi-statically configured by a first node.

In an embodiment, the method further includes that the multiple first time units are continuous in time domain; or the multiple first time units are discontinuous in time domain.

In an embodiment, the method further includes that the second time units included in the first time unit are continuous in time domain; or the second time units included in the first time unit are discontinuous in time domain.

In an embodiment, the method further includes that the frame structure includes one or more first formats.

In an embodiment, the first time unit includes at least one of a radio frame, a half-frame, a subframe, a slot, an orthogonal frequency-division multiplexing (OFDM) symbol cluster, a mini-slot, or an OFDM symbol, where the OFDM symbol cluster includes multiple OFDM symbols.

In an embodiment, the second time unit includes at least one of an OFDM symbol cluster, a mini-slot or an OFDM symbol.

In an embodiment, the method further includes that the number of the one or multiple first time units included in the frame structure is determined in at least one of the following manners: predefinition by a system; semi-static configuration by a first node; or dynamic indication by a second node.

The first node includes at least one of a base station or a relay node. The second node includes at least one of a base station or a relay node.

In an embodiment, the method further includes that a time domain interval between any two adjacent first time units in the multiple first time units includes at least one of a fixed time domain interval or an unfixed time domain interval. In an embodiment, the method further includes that the fixed time domain interval is predefined by a system or semi-statically configured by the first node.

In an embodiment, the method further includes determining the unfixed time domain interval according to a link type.

In an embodiment, the link type is indicated through the frame structure. The link type includes at least one of a wireless backhaul link; an access link; a non-backhaul link; a non-access link; a direct link; a non-direct link; a link between an a-th hop node and a b-th hop node, where a and b are positive integers greater than or equal to 1; or a link between a first node and a target node, where the first node includes at least one of a base station or a relay node, and the target node includes at least one of a base station, a relay node, or a terminal.

In an embodiment, the backhaul link includes at least one of a link between a base station and a relay node, or a link between relay nodes.

In an embodiment, the access link includes a link between a relay node and a terminal, and the direct link includes a link between a base station and a terminal.

In an embodiment, the method includes determining the first format in at least one of the following manners: pre-definition by a system; or semi-static configuration by a first node.

In an embodiment, a number of the second time units included in the first format is determined in at least one of the following manners: predefinition by a system; or semi-static configuration by a first node.

In embodiments of the present disclosure, through the determination of one or multiple first time units and the indication of the frame structure of the one or multiple first time units, the frame structure of the one or multiple first time units can be indicated.

Figure 2:
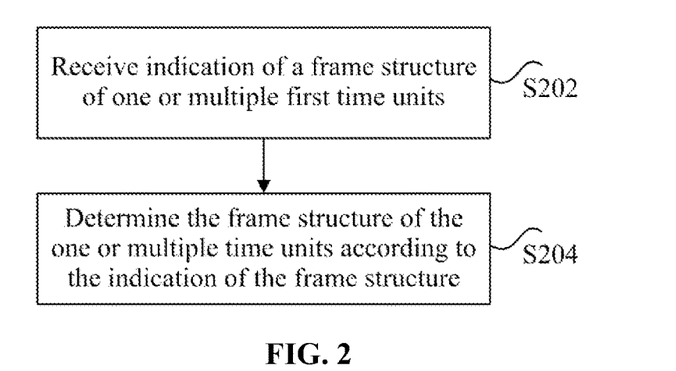
FIG. 2 is a flowchart of a method for determining a frame structure according to an embodiment of the present disclosure.

FIG. 2 is a flowchart of a method for determining a frame structure according to an embodiment of the present disclosure. As shown in FIG. 2, the method includes steps described below.

In S202, indication of a frame structure of one or multiple first time units is received.

In S204, the frame structure of the one or multiple first time units is determined according to the indication of the frame structure.

According to the preceding steps of the embodiment of the present disclosure, the indication of the frame structure of the one or multiple first time units is received, and the frame structure of the one or multiple first time units is determined according to the indication of the frame structure. In this manner, different frame structures can be accurately indicated.

A transmission direction on the one or multiple first time units is indicated by the frame structure. The transmission direction may be, for example, downlink transmission, uplink transmission, or flexible direction. In an embodiment, the first time unit include one or more second time units. The method further includes acquiring a number of the second time units which is predefined by a system; or receiving the number of the second time units which is semi-statically configured by a first node.

In an embodiment, the method further includes that the multiple first time units are continuous in time domain; or the multiple first time units are discontinuous in time domain.

In an embodiment, the method further includes that the second time units included in the first time unit are continuous in time domain; or the second time units included in the first time unit are discontinuous in time domain. In an embodiment, the method further includes that the frame structure includes one or more first formats.

In an embodiment, the method further includes that a number of the one or multiple first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

In an embodiment, the method further includes that a time domain interval between any two adjacent first time units in the multiple first time units includes at least one of a fixed time domain interval or an unfixed time domain interval.

In an embodiment, the method further includes acquiring the fixed time domain interval which is predefined by the system or semi-statically configured by the first node.

In an embodiment, the method further includes determining the unfixed time domain interval according to a link type.

In an embodiment, an indication of the link type by the frame structure is received.

In an embodiment, the method includes determining the first format in at least one of the following manners: pre-definition by a system; or semi-static configuration by a first node.

In an embodiment, a number of the second time units included in the first format is received, where the number of the second time units is determined in at least one of the following manners: predefinition by a system; or semi-static configuration by a first node.

From the description of the preceding embodiments, it is apparent to those skilled in the art that the methods in the preceding embodiment may be implemented by software plus a necessary general-purpose hardware platform or may, of course, be implemented by hardware. Based on this understanding, the embodiments of the present disclosure substantially, or the part contributing to the related art, may be embodied in the form of a software product. The computer software product is stored in a storage medium (such as a read-only memory (ROM)/random-access memory (RAM), a magnetic disk or an optical disk) and includes several instructions for enabling a terminal (which may be, for example, a mobile phone, a computer, a server, or a network equipment) to perform the method according to embodiments of the present disclosure.

An embodiment further provides a device for indicating a frame structure. The device is configured to implement the preceding embodiments. What has been described is not to be repeated. As used below, the term "module" may be software, hardware or a combination thereof capable of implementing a predetermined function. The devices in the embodiments described below are preferably implement by software, but implementation by hardware or by a combination of software and hardware is also possible and conceived.

Figure 3:
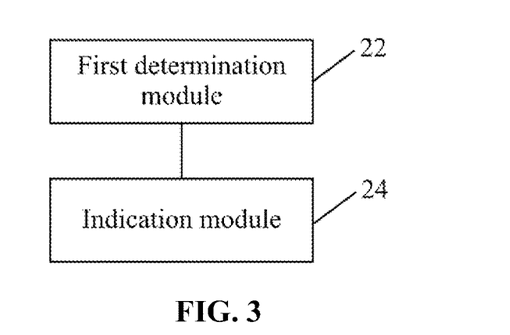
FIG. 3 is a block diagram illustrating the structure of a device for indicating a frame structure according to an embodiment of the present disclosure.

FIG. 3 is a block diagram of a device for indicating a frame structure according to an embodiment of the present disclosure. As shown in FIG. 3, the device may include a first determination module 22 used for determining one or multiple first time units; and an indication module 24 used for indicating a frame structure of the one or multiple first time units.

Through a comprehensive effect of each preceding module, the one or multiple first time units are determined, and the frame structure of the one or multiple first time units is indicated. In this manner, different frame structures can be accurately indicated.

A transmission direction on the one or multiple first time units is indicated by the frame structure. The transmission direction may be, for example, downlink transmission, uplink transmission, or flexible direction. It is to be noted that the determination module 22 in the embodiment may be used for performing S102 in forgoing embodiment of the present disclosure and the indication module 24 in the embodiment may be used for performing S104 in foregoing embodiment of the present disclosure. The examples and application scenarios implemented by the preceding modules and corresponding steps are the same but are not limited to the content disclosed in the preceding embodiments.

In an embodiment, the first determination module 22 is further used for predefining the number of the second time units included in the first time unit by a system; or further used for semi-statically configuring the number of the second time units included in the first time unit by a first node.

It is to be noted that in the embodiment of the present disclosure, the multiple first time units are continuous in time domain; or the multiple first time units are discontinuous in time domain. The frame structure includes one or more first formats.

It is to be noted that in the embodiment of the present disclosure, the first time unit includes at least one of a radio frame, a half-frame, a subframe, a slot, an OFDM symbol cluster, a mini-slot, or an OFDM symbol, where the OFDM symbol cluster includes multiple OFDM symbols. The second time unit includes at least one of an OFDM symbol cluster, a mini-slot, or an OFDM symbol.

In an embodiment, the first determination module 22 is further used for that the number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node. It is to be noted that in the embodiment of the present disclosure, the multiple first time units are continuous in time domain; or the multiple first time units are discontinuous in time domain. The frame structure includes one or more first formats.

A time domain interval between any two adjacent first time units in the multiple first time units includes at least one of a fixed time domain interval or an unfixed time domain interval.

In an embodiment, the indication module 24 is used for predefining the fixed time domain interval by a system or semi-statically configuring the fixed time domain interval by a first node.

In an embodiment, the indication module 24 is further used for determining the unfixed time domain interval according to a link type.

It is to be noted that in the embodiment of the present disclosure, the multiple first time units are continuous in time domain; or the multiple first time units are discontinuous in time domain. The frame structure includes one or more first formats.

In an embodiment, the link type is indicated by the frame structure. The link type includes at least one of a wireless backhaul link; an access link; a non-backhaul link; a non-access link; a direct link; a non-direct link; a link between an a-th hop node and a b-th hop node, where a and b are positive integers greater than or equal to 1; or a link between a first node and a target node, where the first node includes at least one of a base station or a relay node, and the target node includes at least one of a base station, a relay node, or a terminal. The backhaul link includes at least one of a link between a base station and a relay node or a link between relay nodes. The access link includes a link between a relay node and a terminal. The direct link includes a link between a base station and a terminal.

In an embodiment, the first determination module 22 is further used for determining the first format in at least one of the following manners: predefinition by a system; or semi-static configuration by a first node.

In an embodiment, the first determination module is further used for determining the number of the second time units included in the first format in at least one of the following manners: predefinition by a system; or semi-static configuration by a first node.

Figure 4:
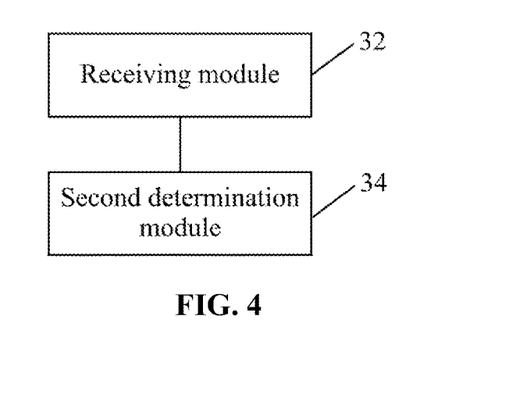
FIG. 4 is a block diagram illustrating the structure of a device for determining a frame structure according to an embodiment of the present disclosure.

FIG. 4 is a block diagram of a device for determining a frame structure according to an embodiment of the present disclosure. As shown in FIG. 4, the device may include a receiving module 32 used for receiving indication of a frame structure of one or multiple first time units; and a second determination module 34 used for determining the frame structure of the one or multiple first time units according to the indication of the frame structure.

A transmission direction on the one or multiple first time units is indicated by the frame structure. The transmission direction may be downlink transmission, uplink transmission, or flexible direction.

Through a comprehensive effect of each preceding module, indication of the frame structure of the one or multiple first time units is received, and the frame structure of the one or multiple first time units is determined according to the indication of the frame structure. In this manner, different frame structures can be accurately indicated.

It is to be noted that the receiving module 32 in the embodiment may be used for performing S202 in foregoing embodiment of the present disclosure and the second determination module 34 in the embodiment may be used for performing S204 in forgoing embodiment of the present disclosure. The examples and application scenarios implemented by the preceding modules and corresponding steps are the same but are not limited to the content disclosed in the preceding embodiments.

In an embodiment, the first time unit include one or more second time units. The receiving module 32 is further used for receiving a number of the second time units which is predefined by a system; or receiving a number of the second time units which is semi-statically configured by a first node.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain.

It is to be noted that in the embodiment of the present disclosure, the frame structure includes one or more first formats.

In an embodiment, the second determination module 34 is further used for determining the number of the first time units included in the frame structure in at least one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

In an embodiment, the second determination module 34 is further used for predefining the fixed time domain interval by a system or semi-statically configuring the fixed time domain interval by a first node.

In an embodiment, the second determination module 34 is further used for determining the unfixed time domain interval according to a link type.

In an embodiment, the receiving module 32 is further used for receiving indication of the link type by the frame structure.

In an embodiment, the receiving module 32 is further used for receiving the first format determined in at least one of the following manners: predefinition by a system; or semi-static configuration by a first node.

In an embodiment, the receiving module 32 is further used for receiving a number of the second time units included in the first format, where the number of the second time units is determined in at least one of the following manners: predefinition by a system; or semi-static configuration by a first node.

Embodiments of the present disclosure further provide a storage medium. A computer program is stored in the storage medium. When the computer program is executed, the steps in any one of the preceding method embodiments are performed.

In an embodiment, the preceding storage medium may be configured to store a computer program for executing the steps described below.

In S1, one or multiple first time units are determined.

In S2, a frame structure of the one or multiple first time units is indicated.

In the embodiment, the preceding program is used for performing the steps described below.

In S3, a number of second time units included in the first time unit is predefined by a system; or the number of the second time units included in the first time unit is semi-statically configured by a first node.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain. It is to be noted that in the embodiment of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

In S5, the fixed time domain interval is predefined by a system or semi-statically configured by a first node.

In S6, the unfixed time domain interval is determined according to a link type.

In S7, the first format is determined in at least one of the following manners: predefinition by a system; or semi-static configuration by a first node.

In S8, the number of the second time units included in first format is determined in at least one of the following manners: predefinition by a system; or semi-static configuration by a first node.

Embodiments of the present disclosure further provide another storage medium. A computer program is stored in the storage medium. When the computer program is executed, the steps in any one of the preceding method embodiments are performed.

In an embodiment, the preceding storage medium may be configured to store a computer program for executing the steps described below.

In S1, indication of a frame structure of one or multiple first time units is received.

In S2, the frame structure of the one or multiple first time units is determined according to the indication of the frame structure.

In the embodiment, the preceding program is used for performing the steps described below.

In S3, a number of second time units predefined by a system is acquired; or the number of the second time units semi-statically configured by a first node is received.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain.

It is to be noted that in the embodiment of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval. In S5, the fixed time domain interval predefined by a system or semi-statically configured by a first node is acquired.

In S6, the unfixed time domain interval is determined according to a link type.

In S7, indication of the link type by the frame structure is received.

In S8, the first format is determined in at least one of the following manners: predefinition by a system; or semi-static configuration by a first node.

In S9, a number of the second time units included in the first format is received, where the number of the second time units is determined in at least one of the following manners: predefinition by a system; or semi-static configuration by a first node.

Embodiments of the present disclosure further provide a processor. The processor is configured to execute a computer program to perform the steps in any one of the preceding method embodiments.

In S1, one or multiple first time units are determined.

In S2, a frame structure of the one or multiple first time units is indicated.

In an embodiment, the preceding program is used for performing the steps described below.

In S3, a number of second time units included in the first time unit is predefined by a system; or the number of the second time units included in the first time unit is semi-statically configured by a first node.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain.

It is to be noted that in the embodiment of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

In S5, the fixed time domain interval is predefined by a system or semi-statically configured by a first node.

In S6, the unfixed time domain interval is determined according to a link type.

In S7, the first format is determined in at least one of the following manners: predefinition by a system; or semi-static configuration by a first node.

In S8, a number of the second time units included in the first format is determined in at least one of the following manners: predefinition by a system; or semi-static configuration by a first node.

Embodiments of the present disclosure further provide another processor. The processor is configured to execute a computer program to perform the steps in any one of the preceding method embodiments.

In S1, indication of a frame structure of one or multiple first time units is received.

In S2, the frame structure of the one or multiple first time units is determined according to the indication of the frame structure.

In an embodiment, the preceding program is used for performing the steps described below.

In S3, a number of second time units predefined by a system is acquired; or the number of the second time units semi-statically configured by a first node is received.

It is to be noted that in embodiments of the present disclosure, the multiple first time units are continuous in time domain; or the multiple first time units are discontinuous in time domain.

It is to be noted that in embodiments of the present disclosure, the second time units included in the first time unit are continuous in time domain; or the second time units included in the first time unit are discontinuous in time domain.

It is to be noted that in embodiments of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

In S5, the fixed time domain interval predefined by a system or semi-statically configured by a first node is acquired.

In S6, the unfixed time domain interval is determined according to a link type.

In S7, indication of the link type by the frame structure is received.

In S8, the first format is determined in at least one of the following manners: predefinition by a system; or a semi-static configuration by a first node.

In S9, a number of the second time units included in the first format is received, where the number of the second time units is determined in at least one of the following manners: predefinition by a system; or semi-static configuration by a first node.

The following embodiments are used in conjunction with the preceding embodiments to describe the preceding method but are not intended to limit the scope of embodiments of the present disclosure.

Embodiment One (1) Indicating Multiple Discontinuous Subframes

When an upper node (equivalent to the first node in the preceding embodiments) indicates a frame structure to a target node (equivalent to the second node in the preceding embodiments), the upper node may indicate frame structures of multiple discontinuous subframes. The upper node may be a base station or a relay node. The target node may be a base station or a relay node.

It is to be noted that the upper node is equivalent to the first node in the claims, and the target node is equivalent to the second node in the claims.

If multiple discontinuous subframes are indicated, the specific indication is as follows. The target node receives a frame structure indication in subframe n, if the frame structure indication includes m slot formats, where m>1, the m slot formats in the frame structure indication can indicate the frame structures of m discontinuous slots. After the target node receives the frame structure indication, which slots the indicated m slots specifically are can be determined in at least one of the manners below.

Figure 5:
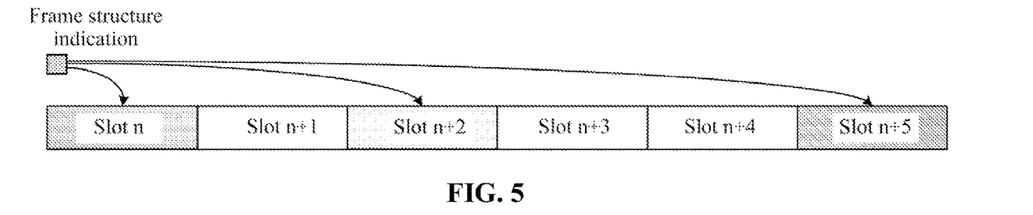
FIG. 5 is schematic diagram one indicating multiple discontinuous subframes according to an embodiment of the present disclosure.

1. A determination is made according to a link type. If the frame structure indication corresponds to link type 1, the frame structures of the m slots respectively correspond to the frame structures of m link type 1 subframes starting from subframe n or from a specific subframe. The link type 1 may be a backhaul link, an access link, a link between the upper node and the target node or a link between a specific node and the target node. Using m=3 as an example, schematic diagram one indicating multiple discontinuous subframes is shown in FIG. 5.

2. The target node learns the link type according to predefinition by a system or semi-static configuration by another node. The link type may be at least one of a backhaul link; an access link; a non-backhaul link; a non-access link; a direct link; a non-direct link; or a link between specific-hop node a and specific-hop node b.

Figure 6:
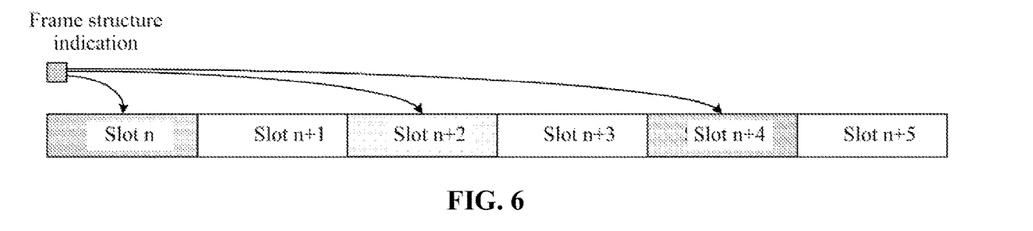
FIG. 6 is schematic diagram two indicating multiple discontinuous subframes according to an embodiment of the present disclosure.

3. A determination is made according to slot indexes. The m slot formats in the frame structure indication correspond to m slots starting from subframe n or from a specific subframe and spaced apart from each other at a fixed subframe interval of x, such as {slot n, slot n+x, . . . , slot n+(m−1)*x}.

The subframe interval x may be predefined by a system or semi-statically configured for a target node by another node. Using m=3 as an example, schematic diagram two indicating multiple discontinuous subframes is shown in FIG. 6.

Embodiment Two (2) Indicating Multiple OFDM Symbol Clusters

When an upper node indicates a frame structure to a target node, the upper node may indicate frame structures of multiple OFDM symbol clusters. The indicated multiple OFDM symbol clusters may be continuous or discontinuous. The numbers of symbols included in respective OFDM symbol clusters may be the same or different. The target node receives a frame structure indication in subframe n, and the frame structure indication received by this target node indicates the frame structures of m OFDM symbol clusters, where m≥1. The target node determines, according to at least one of the following, the frame structures of which OFDM symbol clusters are indicated by the frame structure indication.

Figure 7:
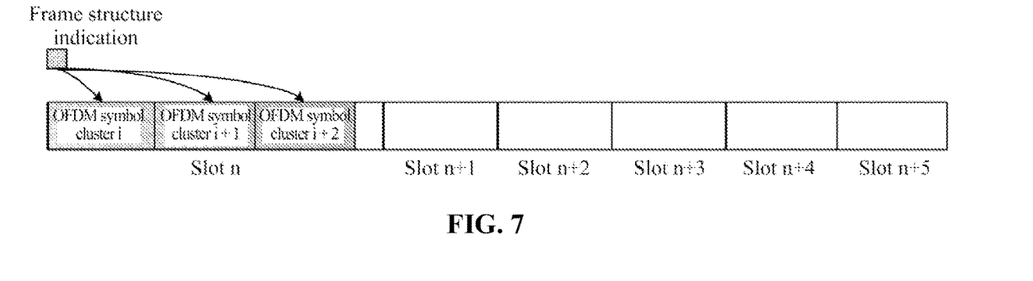
FIG. 7 is schematic diagram one indicating multiple OFDM symbol clusters according to an embodiment of the present disclosure.

The size of one OFDM symbol cluster is predefined by a system or semi-statically configured by another node. Semi-static configuration by another node may include semi-static configuration by the first node. For example, one OFDM symbol cluster includes x OFDM symbols, where x≥1. The m OFDM symbol clusters indicated by the frame structure indication correspond to m continuous OFDM symbol clusters starting from subframe n, from the first OFDM symbol of a specific subframe or from a specific OFDM symbol. Using m=3 as an example, the frame structure indication of {OFDM symbol cluster i, OFDM symbol cluster i+1, OFDM symbol cluster i+2} is shown in FIG. 7, which is schematic diagram one of indicating multiple OFDM symbol clusters.

The m OFDM symbol clusters indicated by the frame structure indication correspond to m discontinuous OFDM symbol clusters starting from subframe n, from the first OFDM symbol of a specific subframe, from a specific OFDM symbol, from the first OFDM symbol cluster or from a specific OFDM symbol cluster. Although the m symbol clusters are discontinuous, they are equally spaced. An interval may be measured by OFDM symbols or OFDM symbol clusters. The interval may be predefined by a system or semi-statically configured by another node to be y OFDM symbols or y OFDM symbol clusters, where y≥1.

Figure 8:
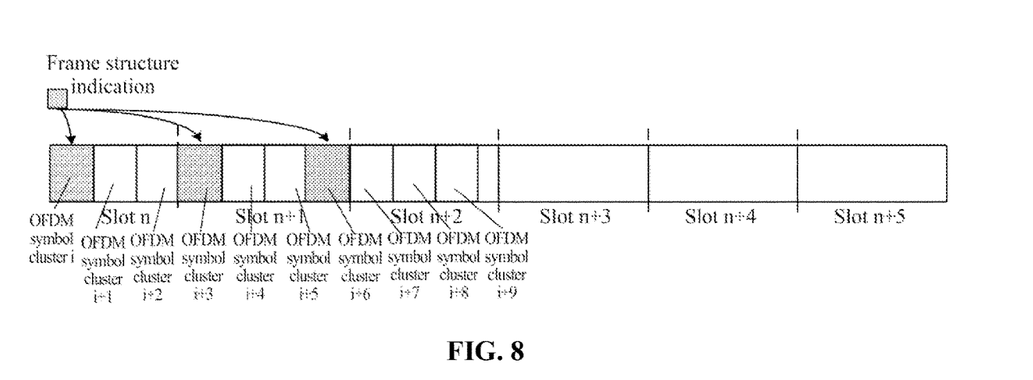
FIG. 8 is schematic diagram two indicating multiple OFDM symbol clusters according to an embodiment of the present disclosure.

Using m=3 as an example, the frame structure indication of {OFDM symbol cluster i, OFDM symbol cluster i+y, OFDM symbol cluster i+2*y}, with y being the number of OFDM symbol clusters, is shown in FIG. 8, which is schematic diagram two of indicating multiple OFDM symbol clusters.

Figure 9:
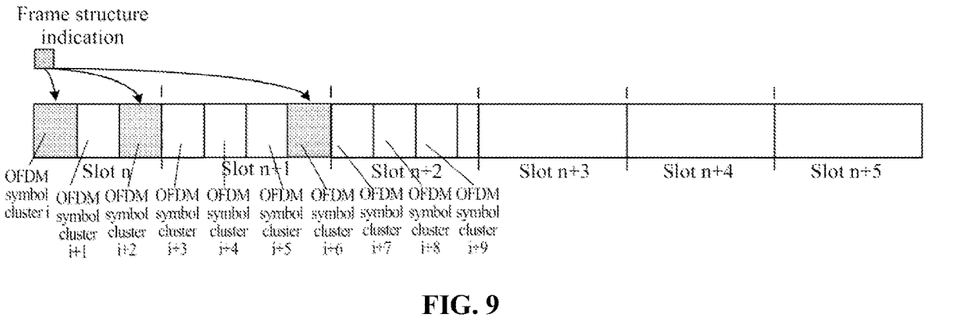
FIG. 9 is schematic diagram three indicating multiple OFDM symbol clusters according to an embodiment of the present disclosure.

The m OFDM symbol clusters indicated by the frame structure indication correspond to m OFDM symbol clusters starting from subframe n, or from the first OFDM symbol of a specific subframe, or from a specific OFDM symbol, or from the first OFDM symbol cluster or from a specific OFDM symbol cluster. The m OFDM symbol clusters may be continuous or discontinuous. If they are discontinuous, they may be equally spaced or unequally spaced and correspond to the same link type. If the frame structure indication is of link type 1, the m OFDM symbol clusters correspond to m OFDM symbol clusters of link type 1, which start from subframe n, or from the first OFDM symbol of a specific subframe or from a specific OFDM symbol, where the m OFDM symbol clusters may be continuous or discontinuous. Using m=3 as an example, schematic diagram three of indicating multiple OFDM symbol clusters is shown in FIG. 9.

The target node learns the link type according to predefinition by a system or semi-static configuration by another node. The link type may be at least one of a backhaul link; an access link; a non-backhaul link; a non-access link; a direct link; a non-direct link; or a link between specific-hop node a and specific-hop node b.

The link type 1 is one of the preceding link types.

Embodiment Three (3) Indicating Multiple OFDM Symbols

When an upper node indicates a frame structure to a target node, the upper node may indicate frame structures of multiple OFDM symbols. The indicated multiple OFDM symbols may be continuous or discontinuous and may be the same or different. The target node receives a frame structure indication in subframe n, and the frame structure indication indicate the frame structures of m OFDM symbols, where m≥1. The target node determines, according to at least one of the following, the frame structures of which OFDM symbols are indicated by the frame structure indication.

Figure 10:
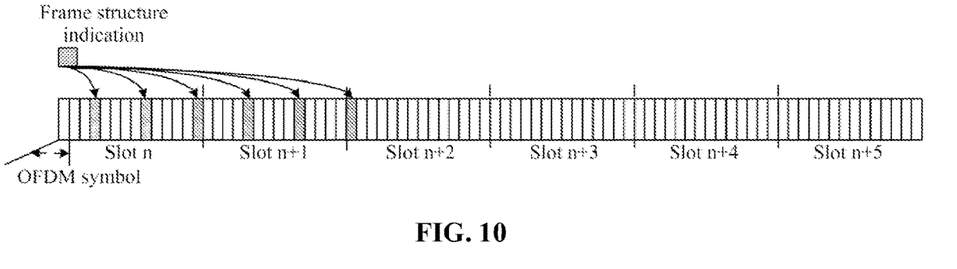
FIG. 10 is schematic diagram one indicating multiple OFDM symbols according to an embodiment of the present disclosure.

If the m symbols are discontinuous, where the interval between former and latter OFDM symbols is x OFDM symbols, then the size of the interval x may be predefined by a system or semi-statically configured by another node, where x≥1. For example, the m OFDM symbols indicated by the frame structure indication correspond to m equally spaced discontinuous OFDM symbols starting from subframe n, the first OFDM symbol of a specific subframe or a specific OFDM symbol. Using m=6 and interval x=4 as an example, the frame structure indication of {OFDM symbol cluster i, OFDM symbol cluster i+x, OFDM symbol cluster i+2*x, OFDM symbol cluster i+3*x, OFDM symbol cluster i+4*x, OFDM symbol cluster i+5*x} is shown in FIG. 10, which is schematic diagram one of indicating multiple OFDM symbols.

Figure 11:
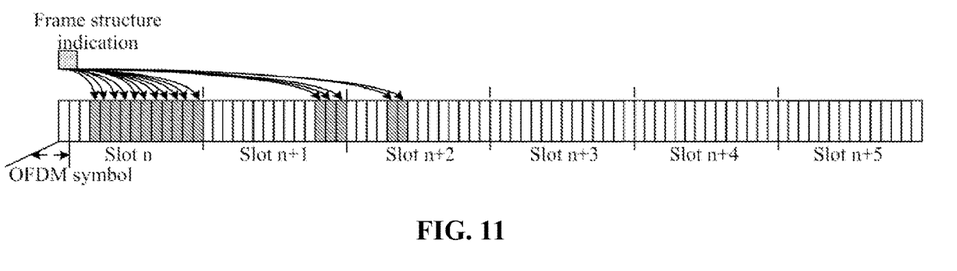
FIG. 11 is schematic diagram two indicating multiple OFDM symbols according to an embodiment of the present disclosure.

If the m symbols are discontinuous, the frame structures of which OFDM symbols are indicated by the frame structure indication are determined according to the type link. If the frame structures indication corresponds to link type 1, the m OFDM symbols indicated by the frame structure indication respectively correspond to the frame structures of the m OFDM symbols of link type 1, which start from subframe n, the first OFDM symbol of a specific subframe or a specific OFDM symbol. They may be m continuous OFDM symbols or m discontinuous OFDM symbols. Using m=16 as an example, schematic diagram two of indicating multiple OFDM symbols is shown in FIG. 11.

The target node learns the link type according to predefinition by a system or semi-static configuration by another node. The link type may be at least one of a backhaul link; an access link; a non-backhaul link; a non-access link; a direct link; a non-direct link; or a link between specific-hop node a and specific-hop node b.

The link type 1 is one of the preceding link types.

Embodiment Four (4) A New SFI Format Corresponding to Continuous OFDM Symbols A time unit, for which a frame structure is configured, is multiple OFDM symbols. How many OFDM symbols are included in the time unit may be predefined by a system or semi-statically configured by a specific node. For example, if it is predefined by a system or semi-statically configured by a specific node that 4 OFDM symbols are included in the time unit, one frame structure format can indicate transmission attributes of the 4 OFDM symbols, and the 4 OFDM symbols are continuous.

Embodiment Five (5) A New SFI Format Corresponding to Discontinuous OFDM Symbols A time unit, for which a frame structure is configured, is multiple OFDM symbols. How many OFDM symbols are included in the time unit may be predefined by a system or semi-statically configured by a specific node. For example, if it is predefined by a system or semi-statically configured by a specific node that 4 OFDM symbols are included in the time unit, one frame structure format can indicate transmission attributes of the 4 OFDM symbols, and the frame structure indication of one time unit can indicate 4 continuous or discontinuous OFDM symbols.

Figure 12:
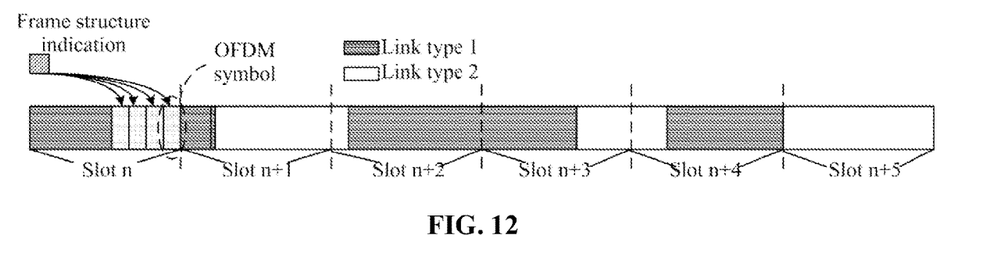
FIG. 12 is schematic diagram one of continuous OFDM symbols corresponding to a new SFI format according to an embodiment of the present disclosure.
Figure 13:
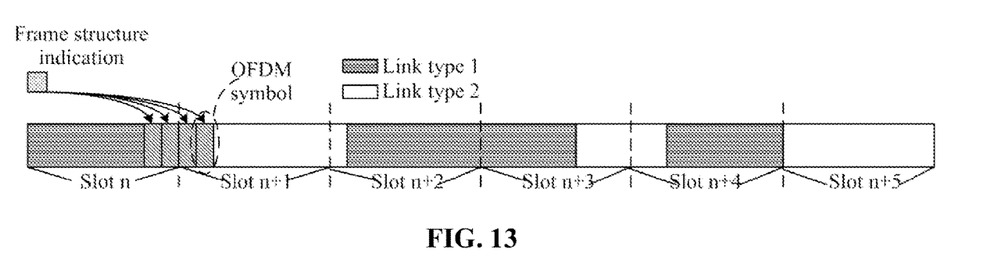
FIG. 13 is schematic diagram two of continuous OFDM symbols corresponding to a new SFI format according to an embodiment of the present disclosure.

From the OFDM symbol valid as indicated by the frame structure indication, when the number of continuous OFDM symbols satisfying a specific link type is not less than 4 OFDM symbols, then for the frame structure indication of one time unit, the transmission attributes of 4 continuous OFDM symbols can be indicated. See schematic diagram one as shown in FIG. 12 in which a new SFI format corresponding to continuous OFDM symbols or schematic diagram two as shown in FIG. 13 in which a new SFI format corresponding to continuous OFDM symbols. The difference between FIG. 12 and FIG. 13 is whether the indicated 4 OFDM symbols cross a slot boundary.

Figure 14:
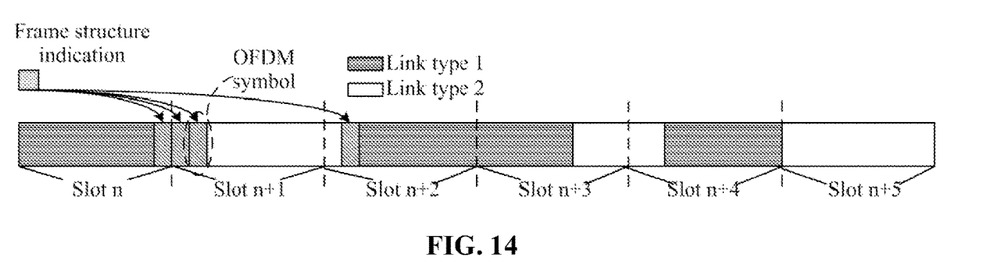
FIG. 14 is schematic diagram three of discontinuous OFDM symbols corresponding to a new SFI format according to an embodiment of the present disclosure.

From the OFDM symbol valid as indicated by the frame structure indication, when the number of continuous OFDM symbols satisfying a specific link type is less than 4 OFDM symbols, then for a frame structure indication of one time unit, the transmission attributes of 4 discontinuous OFDM symbols can be indicated. The former part of the 4 OFDM symbols indicates the transmission attributes of multiple continuous OFDM symbols ranging from the start symbol indicated by the frame structure until OFDM symbols that satisfy the specific link type end. If the former part indicates x OFDM symbols, the latter part of the 4 OFDM symbols indicates 4−x continuous OFDM symbols which satisfy the specific link type and start from the start OFDM symbol of a next segment of time domain resources, where x<4. In FIG. 12, x=3, and schematic diagram three of a new SFI format corresponding to discontinuous OFDM symbols is shown in FIG. 14.

Apparently, it is to be understood by those skilled in the art that the one or more modules or the one or more steps in embodiments of the present disclosure may be implemented by a general-purpose computing device and may be concentrated on a single computing device or distributed in a network formed by multiple computing devices. These modules or steps may be implemented by program codes executable by the computing device. Thus, these modules or steps may be stored in a storage device and executed by the computing device. Moreover, in some cases, the illustrated or described steps may be executed in a sequence different from the sequence described herein. Alternatively, each module or step may be implemented by being made into an integrated circuit module separately or multiple ones of these modules or steps may be implemented by being made into a single integrated circuit module. In this manner, the present disclosure is not limited to any specific combination of hardware and software.

What is claimed is:

1. A method for indicating a frame structure, applied to a first node in a wireless communication system, wherein the system comprises the first node and a target node, wherein the first node comprises at least one of a base station or a relay node, and the target node comprises at least one of a base station, a relay node or a terminal, wherein the method comprises:

determining at least one first time unit; and indicating the frame structure of the at least one first time unit;

wherein each of the at least one first time unit comprises at least one second time unit, each of the at least one first time unit comprises a slot, and each of the at least one second time unit comprises at least one of: an orthogonal frequency-division multiplexing (OFDM) symbol cluster or an OFDM symbol, wherein the OFDM symbol cluster comprises multiple OFDM symbols;

wherein in response to the at least one second time unit comprises a plurality of second time units, the plurality of second time units comprised in the slot are discontinuous in time domain, and the plurality of discontinuous second time units correspond to a same link type, wherein the method further comprises: indicating the link type by the frame structure of the slot, wherein the link type comprises at least one of a wireless backhaul link; an access link; a non-backhaul link; a non-access link; a direct link; a non-direct link; or a link between an a-th hop node and a b-th hop node, wherein a and b are positive integers greater than or equal to 1; or a link between the first node and the target node; wherein the wireless backhaul link comprises at least one of a link between a base station and a relay node or a link between relay nodes; the access link comprises a link between a relay node and a terminal; the direct link comprises a link between a base station and a terminal;

wherein a number of the plurality of discontinuous second time units comprised in the slot is predefined by the system, or the number of the plurality of discontinuous second time units comprised in the slot is semi-statically configured by the first node; and wherein in response to the at least one first time unit comprises a plurality of first time units, a time domain interval between any two adjacent first time units of the plurality of first time units comprises at least one of a fixed time domain interval or an unfixed time domain interval, wherein the fixed time domain interval is predefined by the system or is semi-statically configured by the first node, and the unfixed time domain interval is determined according to the link type.

2. The method of claim 1, wherein in response to the at least one first time unit comprises a plurality of first time units, the plurality of first time units are discontinuous in the time domain.

3. The method of claim 1, wherein the frame structure comprises one or more first formats.

4. The method of claim 1, further comprising:
   determining a number of the at least one first time unit comprised in the frame structure in one of following manners:
   predefinition by the system;
   semi-static configuration by the first node; or
   dynamic indication by a second node,
   wherein the second node comprises at least one of a base station or a relay node.

5. The method of claim 3, wherein the method further comprises determining the one or more first formats in at least one of the following manners:
   predefinition by the system; or
   semi-static configuration by the first node;
   or wherein the method further comprises determining a number of the plurality of second time units comprised in the one or more first formats in at least one of the following manners:
   predefinition by the system; or
   semi-static configuration by the first node.

6. A method for determining a frame structure, applied to a relay node or a terminal comprised in a target node in a wireless communication system, wherein the system comprises the target node and a first node, wherein the target node comprises at least one of a base station, the relay node or the terminal, and the first node comprises at least one of a base station or a relay node, wherein the method comprises:
   receiving an indication of the frame structure of at least one first time unit;
   determining the frame structure of the at least one first time unit according to the indication of the frame structure;
   wherein each of the at least one first time unit comprises at least one second time unit, each of the at least one first time unit comprises a slot, and each of the at least one second time unit comprises at least one of: an orthogonal frequency-division multiplexing (OFDM) symbol cluster or an OFDM symbol, wherein the OFDM symbol cluster comprises multiple OFDM symbols;
   wherein in response to the at least one second time unit comprises a plurality of second time units, the plurality of second time units comprised in the slot are discontinuous in time domain, and the plurality of discontinuous second time units correspond to a same link type, wherein the method further comprises: receiving an indication of the link type by the frame structure of the slot, wherein the link type comprises at least one of a wireless backhaul link; an access link; a non-backhaul link; a non-access link; a direct link; a non-direct link; or a link between an a-th hop node and a b-th hop node, wherein a and b are positive integers greater than or equal to 1; or a link between the first node and the target node; wherein the wireless backhaul link comprises at least one of a link between a base station and a relay node or a link between relay nodes; the access link comprises a link between a relay node and a terminal; the direct link comprises a link between a base station and a terminal;
   wherein the method further comprises: acquiring a number of the plurality of discontinuous second time units which is predefined by the system; or receiving the number of the plurality of discontinuous second time units which is semi-statically configured by the first node; and
   wherein in response to the at least one first time unit comprises a plurality of first time units, a time domain interval between any two adjacent first time units of the plurality of first time units comprises at least one of a fixed time domain interval or an unfixed time domain interval, wherein the fixed time domain interval is predefined by the system or is semi-statically configured by the first node, and the unfixed time domain interval is determined according to the link type.

7. The method of claim 6, wherein in response to the at least one first time unit comprises a plurality of first time units,
   the plurality of first time units are discontinuous in the time domain.

8. The method of claim 6, wherein the frame structure comprises one or more first formats.

9. The method of claim 8, wherein the method further comprises determining the one or more first formats in at least one of the following manners: predefinition by the system; or semi-static configuration by the first node;
   or wherein the method further comprises determining a number of the plurality of second time units comprised in the one or more first formats in at least one of the following manners: predefinition by the system; or semi-static configuration by the first node.

10. The method of claim 6, further comprising:
    determining a number of the at least one first time unit comprised in the frame structure in one of the following manners:
    predefinition by the system;
    semi-static configuration by the first node; or
    dynamic indication by a second node,
    wherein the second node comprises at least one of a base station or a relay node.

11. An electronic device, comprising a memory and a processor, wherein a computer program is stored in the memory, and the processor is configured to execute the computer program to perform the method of claim 1.

12. An electronic device, comprising a memory and a processor, wherein a computer program is stored in the memory, and the processor is configured to execute the computer program to perform the method of claim 6.

13. A non-transitory storage medium storing a computer program, wherein when the computer program is executed by a processor, the method of claim 1 is performed.

14. A non-transitory storage medium storing a computer program, wherein when the computer program is executed by a processor, the method of claim 6 is performed.

* * * * *